(12) United States Patent
Niakan

(10) Patent No.: US 7,556,663 B2
(45) Date of Patent: Jul. 7, 2009

(54) DUAL PLEATED AIR FILTER

(75) Inventor: Shahriar Nick Niakan, Anaheim Hills, CA (US)

(73) Assignee: Advanced Flow Engineering, Inc., Corona, CA (US)

( * ) Notice: Subject to any disclaimer, the term of this patent is extended or adjusted under 35 U.S.C. 154(b) by 439 days.

(21) Appl. No.: 11/346,482

(22) Filed: Feb. 1, 2006

(65) Prior Publication Data

US 2007/0175193 A1    Aug. 2, 2007

(51) Int. Cl.
*B01D 46/00* (2006.01)
(52) U.S. Cl. ............... 55/385.3; 55/485; 55/486; 55/487; 55/497; 55/502; 55/527; 55/528; 55/529; 55/DIG. 24; 55/521
(58) Field of Classification Search ........ 55/385.3, 55/487, 498, 486, 485, 527, 528, DIG. 24, 55/502, 529, 497, 521
See application file for complete search history.

(56) References Cited

U.S. PATENT DOCUMENTS

| | | | |
|---|---|---|---|
| 6,312,489 B1 * | 11/2001 | Ernst et al. | 55/385.3 |
| 6,811,588 B2 * | 11/2004 | Niakin | 55/385.3 |
| 6,825,136 B2 * | 11/2004 | Cook et al. | 442/6 |
| 7,008,468 B2 * | 3/2006 | Ashe | 95/286 |
| 2005/0132682 A1 * | 6/2005 | Paul | 55/486 |

* cited by examiner

*Primary Examiner*—Duane Smith
*Assistant Examiner*—Minh-Chau T Pham
(74) *Attorney, Agent, or Firm*—Paul J. Backofen, Esq.; Crockett & Crockett

(57) ABSTRACT

A dual pleated air filter according to the present disclosure may include two or more generally parallel, pleated filter elements layered perpendicular to the influent air stream and having the pleats of adjacent filter elements oriented orthogonally. Within each pleated filter element are an influent mesh layer and a corresponding effluent mesh layer for supporting filter media and one or more layers of filter media are located between the influent and the effluent mesh layers. The relative orientation of pleats of adjacent elements may range from parallel to perpendicular.

23 Claims, 4 Drawing Sheets

DUAL PLEATED AIR FILTER

FIELD OF THE INVENTIONS

The inventions described below relate the field of air filtration and more specifically to high performance air filtration for internal combustion engines.

BACKGROUND OF THE INVENTIONS

Most people are familiar with air filters used in their cars. These filters are essential to proper operation of the engine, and help extend the life of the engine and its components. Automotive air filters must be replaced periodically because they become clogged and thus inhibit the flow of air into the engine. To the typical consumer, the air filter is cheap, and its replacement is a small additional bother that is handled along with oil changes. However, in dusty environments, high performance applications, industrial and farming applications, the cost of air filters and the burden of replacement may be significant, and a significant increase in filter performance and lifespan can be very valuable.

The air available to the typical automotive or industrial combustion engine always often carries some dirt and debris, or particulate material. Particulate material can cause substantial damage to the internal components of an internal combustion system if taken into the engine. The function of the air intake filter is to remove the particulate matter from the intake air, so that clean air is provided to the engine.

Choosing filter media that has a high filter efficiency, determined by the percentage of entrained material removed from the intake air, is important because any particulate matter passing through the filter will harm the engine. The choice of filter media which is permeable to air flow is important because the interposition of the filter into the intake air stream can impede air flow, and this decreases engine efficiency, horsepower, torque, and fuel economy. It is desirable, then, that an air filter effect both a minimal reduction in airflow as well as a minimal increase in the resistance, or restriction, to air flowing into the engine. The choice of filter media that can effectively filter air for extended periods without becoming clogged is also important, so that operation of the engine need not be interrupted frequently to change the air filter.

The features and filter design choices that lead to improvements in one of these parameters can lead to losses in the other performance parameters. Thus, filter design involves trade-offs among features achieving high filter efficiency, and features achieving a high filter capacity and concomitant long filter lifetime. As used herein, filter efficiency is the propensity of the filter media to trap, rather than pass, particulates. Filter capacity is typically defined according to a selected limiting pressure differential across the filter, typically resulting from loading by trapped particulates. For systems of equal efficiency, a longer filter lifetime is typically directly associated with higher capacity or depth loading, because the more efficiently a filter medium removes particles from a fluid stream, the more rapidly that filter medium approaches the pressure differential indicating the end of the filter medium life.

A particular filter medium can be very efficient, with a single layer removing a large percentage of the particles entrained in the fluid, for example, by collecting particles as a dust cake on the dirty side of the filter. Such "surface-loading" media includes paper and dense mats of cellulose fibers, with small pores. Initially, the dust cake can increase filter efficiency by itself operating as a filter. Over time, the dust cake tends to shorten the media lifetime, as more trapped particles occlude the filter medium surface pores, resulting in increased differential pressure across the filter. Depending upon the airflow through, and operating conditions of, the filter, a high-efficiency surface-loading filter medium can quickly reach a lifetime load. To extend filter lifetime, filter media can be pleated, providing greater filtering surface area.

Structural considerations are also a factor in filter design. If the filter is too flexible as with less restrictive media, the vibrations inherent in internal combustion engines may cause the filter to disengage from one or more areas of its housing thus allowing unfiltered air to bypass the filter. Many pleated filters require additional structural elements to create a filter with sufficient rigidity to retain engagement with the filter housing.

What is needed is a filter having good depth loading capacity with inherent rigidity to permit use of low restriction media while minimizing the likelihood of filter housing disengagement and filter bypass.

SUMMARY

Pleated air filter elements are used to increase the surface area of the air filter and extend the useful life and particulate load a filter may accommodate before requiring replacement. The intake air stream flows from the influent, or "dirty," side of the filter to the effluent, or "clean," side of the filter, with the filter media in the air filter elements extracting the unwanted particles via one or more filter media layers. Filter media are selected to trap particles exceeding a particular size, while remaining substantially permeable to air flow.

A dual pleated air filter according to the present disclosure may include two or more generally parallel, pleated filter elements layered perpendicular to the influent air stream and having the pleats of adjacent filter elements oriented orthogonally. Within each pleated filter element are an influent mesh layer and a corresponding effluent mesh layer for supporting filter media and one or more layers of filter media are located between the influent and the effluent mesh layers. The relative orientation of pleats of adjacent elements may range from parallel to perpendicular.

A pleated influent filter element according to the present disclosure may include a foam prefilter layer in the influent filter element along with four or more natural fiber filter layers. The foam prefilter and the natural fiber layers may be supported and enclosed between an influent and an effluent mesh layer. A corresponding effluent filter element may include four or more natural fiber filter layers and one or more synthetic fiber filter layers. The natural fiber layers and the synthetic fiber layers may be supported and enclosed between an influent and an effluent mesh layer.

The filter media layers of each filter element may be arranged to form gradient-density filter media. The combined filter elements of a dual pleated air filter may also form a gradient-density filter. The influent filter element may include a foam prefilter and four or more natural fiber filter layers arranged in increasing density along the air flow axis, and the effluent filter media may include four or more natural fiber filter layers and one or more synthetic filter layers arranged in increasing density along the air flow axis.

An alternative pleated air filter according to the present disclosure may include an influent pleated filter element and an effluent pleated filter element, the two, pleated filter element are layered perpendicular to the air stream with the pleats of each filter element oriented orthogonally. Within each pleated filter element are an influent mesh layer and a corresponding effluent mesh layer for supporting filter media. The one or both pleated filter elements may include one or more layers of synthetic foam between the influent mesh layer and the effluent mesh layer, one or more layers of cotton fiber filter media formed from a piteous, absorbent, and wickable natural fiber between the one or more layers of synthetic foam and the effluent mesh layer, one or more layers of spunbond polyester fiber filter media between the one or more layers of cotton fiber filter media and the effluent mesh layer, and an optional efficacious amount of oil may be disposed in the one or more layers of synthetic foam and or the one or more layers of cotton fiber filter media.

DETAILED DESCRIPTION OF THE INVENTIONS

Figure 1:
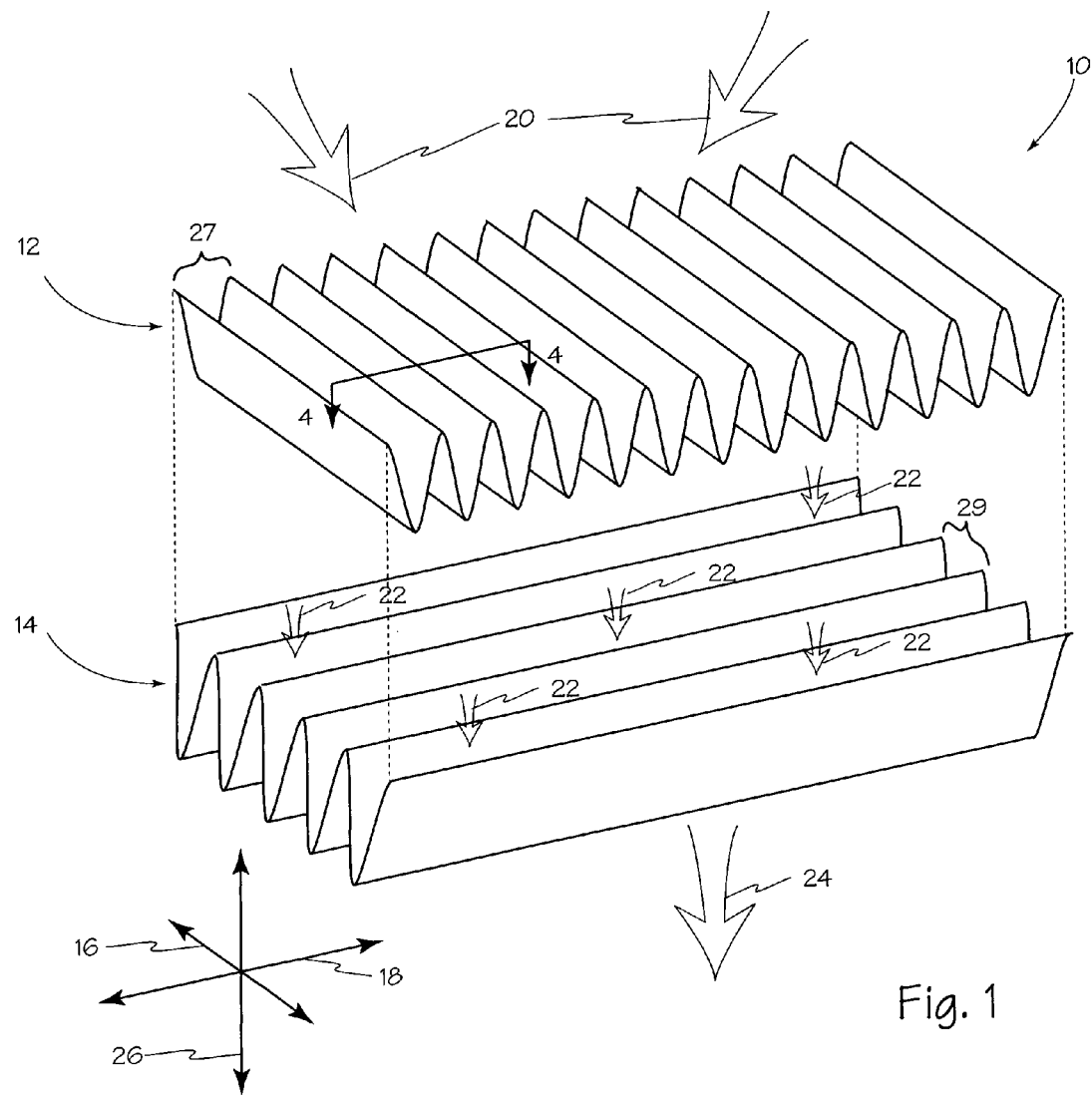
FIG. 1 is an exploded perspective view of the filter elements according to the present disclosure.

Referring to FIG. 1, dual pleated air filter 10 includes two or more pleated filter elements such as influent filter element 12 and effluent filter element 14. Each filter element is oriented parallel to the plane of axes 16-18 and perpendicular to air stream 20-22-24 which is parallel to air flow axis 26. Pleats of influent filter element 12 such a pleat 27 are oriented perpendicular to axis 26, here influent filter pleats such as pleat 27 are oriented parallel to axis 16. Pleats of effluent filter element 14 such a pleat 29 are oriented perpendicular to axis 26 and axis 16, here effluent filter pleats such as pleat 29 are oriented parallel to axis 18.

Relative orientation of pleats of adjacent elements such as effluent filter element 14, and influent filter element 12 may range from parallel to perpendicular as shown. A dual pleated air filter may be suitably employed is any type of air filter, including flat pan filters, cylindrical filters, cone filters and universal style filters.

Influent air 20 encounters influent filter element 12 that removes particulates and other matter entrained in influent air 20. Prefiltered air 22 passes from influent filter element 12 to effluent filter element 14. Effluent filter element 14 removes particulates and other matter entrained in prefiltered air 22 forming effluent air 24 for use by an engine compressor or other suitable device.

Figure 2:
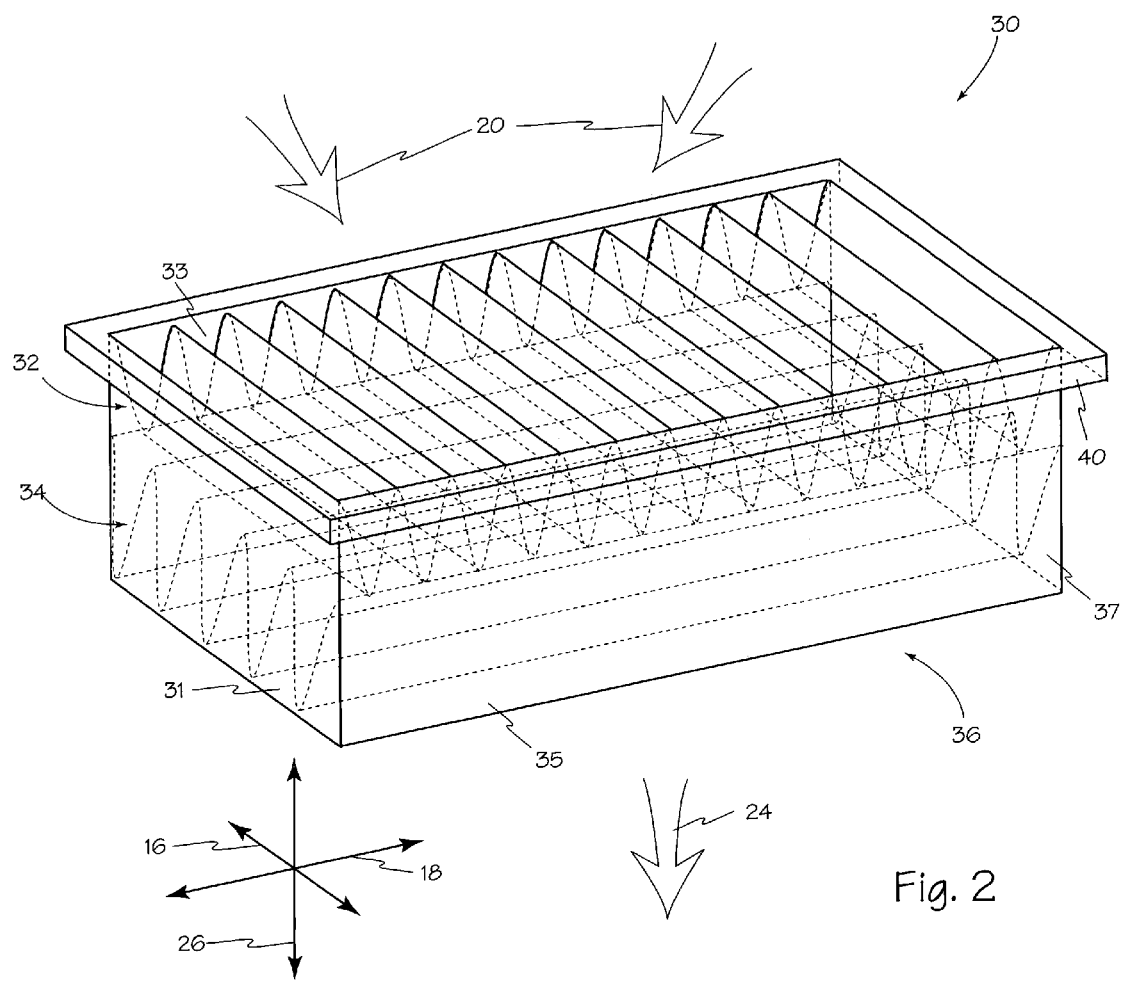
FIG. 2 is a perspective view of a dual pleated air filter according to the present disclosure.

Referring now to FIG. 2, dual pleated air filter 30 includes two generally parallel filter elements, influent filter element 32 and effluent filter element 34. The pleats of each filter elements are oriented perpendicular to air flow axis 26, and the pleats of each respective filter element are mutually perpendicular. The filter elements are enclosed by an air-tight filter frame 36 having sides such as sides 31, 33, 35 and 37. The filter frame may be formed of any suitable material and may also include seal element 40. Influent air 20 is controlled by the filter frame and the seal element and forced to transit dual pleated air filter 30 through influent filter element 32 and then effluent filter element 34 parallel to air flow axis 26.

Figure 3:
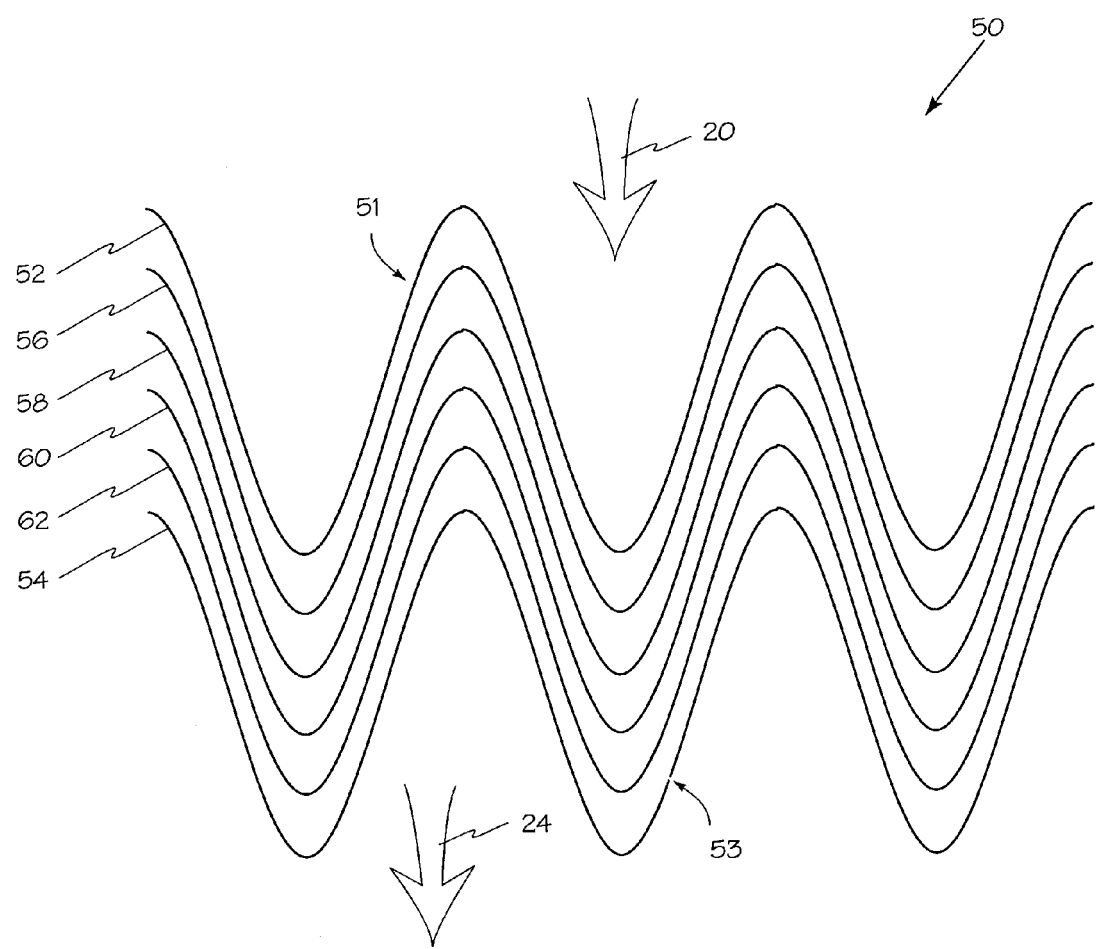
FIG. 3 is a cross section view of a portion of the pleated filter media of FIG. 2.

Referring now to FIG. 3, filter media 50 is a multiple layer air filter media that includes several filter layers 56, 58, 60 and 62 sandwiched or interposed between structural mesh layers 52 and 54. In this illustration, the "dirty," or influent, side of media 50 is the side of the filter that is upstream in the flow path of air such as side 51. The "clean," or effluent side of the media is the side of the filter that is downstream such as side 53. Effluent air 24 flowing out of effluent side 53 may be provided to an engine or other suitable device.

Structural mesh layers 52 and 54 may be made of any suitable material such as lightweight aluminum mesh, various metals, plastics and polymers. An exemplary aperture count for layers 52 and 54 may be approximately 18×14 openings per inch, although other aperture counts may be suitable. In addition, it may be desirable that mesh layers 52 and 54 be epoxy-coated. Although both layers 52 and 54 may be so protected, it may be particularly desirable to epoxy-coat influent mesh layer 52, guarding the thin mesh against granulates, foreign objects, and injurious incidents.

Fiber layers 56, 58, 60 and 62 may include natural fibers and/or manufactured or synthetic fibers. Fiber layers 56, 58, 60 and 62 may all be natural fiber layers, all manufactured fiber layers, or a mixture of natural and manufactured fiber layers. The natural fiber layers are most conveniently cotton, but other natural fibers such as silk, jute, ramie, flax, cellulosic fibers, wool and the like may be used. Manufactured fiber layers are most conveniently made of synthetic fibers, such as spunbond polyester, but can also be made of other synthetic fabrics (nylon, olefin, acrylic, etc.), polymers, glasses, and modified or transformed natural polymers, and modified cellulosic fibers. More or fewer filter layers may also be used in each filter element such as influent filter element 12 of FIG. 1.

In general, where natural fibers are used, it may be desirable to use cotton mesh, because the constituent cotton fibers tend to be both highly piteous (that is, each cotton thread has many small hairy fibers sticking out of it) and highly wickable. Cotton meshes can include gauze, cheesecloth and spun laced fabric. Gauze, cheesecloth and similar fabrics may be characterized as thin, open-meshed, low thread-count, plain weave, soft fabric. An example of a cotton gauze that may be advantageously employed in filter media 50 is "absorbent gauze," as described in the United States Pharmacopoeia (USP), which must meet specific standards of construction, chemical purity and absorbency.

Another exemplary cotton mesh that can be used in filter media 50 is spun-lace, or hydroentangled, non-woven cotton fabric. Spun-lace cotton is a non-woven fabric produced using high-velocity jets or curtains of water to entangle fibers into fiber bundles, in a repeating web-like pattern, thereby forming a strong fabric. This technique preserves the pure fiber condition, which is conducive to making high absorbency products, substantially free of binders and chemical impurities. Spun-lace cotton fabric can be engineered to exhibit structural characteristics tailored to the medium application.

For example, with hydro-entangled fabric, fiber bundles may be designed with high-density areas that provide a fine capillary structure and allows a rapid absorbency rate. Moreover, the uniformity of the fabric pattern, the open spaces, the stability of fabric openings, the various physical and functional characteristics and the open pattern imparted to the fabric can be different from those obtained with plain-woven gauze.

Returning to FIG. 3, fiber layers 56, 58, 60 and 62 may be provided with increasing thread count or weave fineness, such that fiber layer 56, having the coarsest, or most open weave, mesh, is disposed in proximate contact with structural mesh layer 52, and fiber layer 62, having the highest thread count and the finest, or least open weave of the selected fiber meshes, adjacent to or in proximate contact with, clean side mesh layer 54. Interposed between layers 56 and 62 may be additional fiber layers, wherein layer 58 is less coarse than layer 56, and layer 60 is coarser than layer 62. In this manner, a gradient-density, depth-loading filter media can be constructed in media 50.

One or more synthetic fiber layers may be interposed between filter layer 62 and structural mesh layer 54. Synthetic fiber layers may comprise spun-bond polyester webs, meshes or mats, which are prepared from drawn, randomly-laid, and thermally-, or ultrasonically-bonded continuous polyester filaments. Preferred varieties of spun-bond filtration media are fabricated without binders, thereby minimizing contamination of air flowing through the media. Exemplary spun-bond polyester fibers include Reemay® 2024 medium, being about 12 mils thick with a basis weight of about 71 g./sq. m.; and Reemay® 443 medium, being about 17 mils thick with a basis weight of about 10 g./sq. m. Both media are formed from straight, trilobal polyester fibers having a diameter of about 23 microns. Reemay® media are produced by Reemay, Inc., Old Hickory, Tenn., and are well-known in the fluid filtration art. Any suitable synthetic fibers may be used, with absorbent, efficient, fibers having low contaminant content especially desirable.

Alternatively, one or more synthetic foam prefilter layers may be interposed between structural mesh layer 52 and filter layer 56. Foam prefilters may be incorporated in one or more filter elements such as influent filter element 12 and or effluent filter element 14 of FIG. 1.

Optionally, filter media may be treated with oil or other tacking agents that may extend the lifespan of the filter described above. One or more filter layers may be wetted with oil. Because cotton fibers are generally oleophilic and absorb oil, the oil tends to be thoroughly wicked and absorbed by the fine pili, or hairs, of the cotton fibers. Foam media also holds oil well in the open cell structure. It is desirable to merely wet, and not soak, the filter media 50 with oil, because oil soaking which completely fills the interstices of foam and between the fabric threads with oil increasing resistance to airflow. By selecting the type and the composition of the oil employed during oil wetting, the cotton fiber pili may swell, and present an advantageously larger surface area to the flowing air, further enhancing the performance of filter media 50. Suitable tacking agents for wetting the filter media include mineral oil, engine oil, and other tacking agents, and combinations of these components. Any suitable tacking agent may be conveniently applied as a liquid or aerosol spray.

Figure 4:
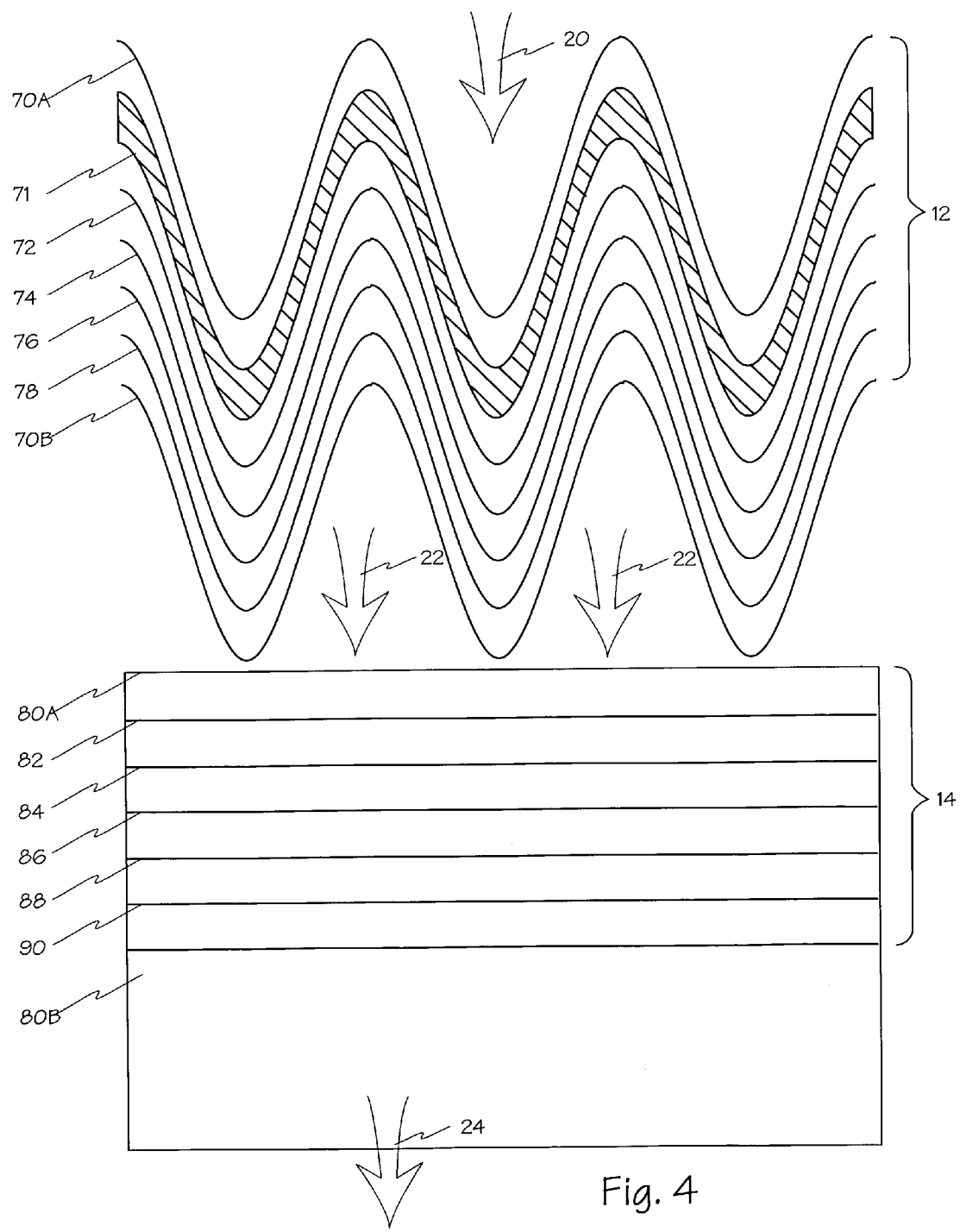
FIG. 4 is a cross section view of a portion of the pleated filter elements of FIG. 1 taken along line 4-4.

Referring now to FIG. 4, influent filter element 12 may include prefilter 71 adjacent influent support mesh 70A and one or more filter layers such as filter layers 72, 74, 76 and 78 between prefilter 71 and effluent support mesh 70B. Filter layers 72, 74, 76 and 78 may be formed of any suitable material and may also have a density gradient as discussed above. Prefilter 71 may be any suitable media such as synthetic foam.

Effluent filter element 14 is shown perpendicular to influent filter element 12 and airflow axis 26. One or more filter layers such as filter layers 82, 84, 86, 88 and 90 may be sandwiched between pleated structural mesh layers 80A and 80B. Filter layers 82, 84, 86, 88 and 90 may be formed of any suitable material or combinations of materials and may also have a density gradient as discussed above.

For example, layers 82, 84, and 86 may be natural fiber layers with layer 82 having the lowest density and layer 86 having the highest density. Layers 88 and 90 may be formed of synthetic fibers or other suitable material with layer 88 having a density higher than layer 86, and layer 90 having a density higher than layer 88. Alternatively, layer 82 may be synthetic and layers 84, 86, 88 and 90 may be natural fiber, or layers 82, 86 and 90 may be natural fiber and layers 84 and 88 may be synthetic.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. An air filter comprising:
    an influent filter element, the influent filter element being generally planar and having a plurality of parallel pleats parallel to a first direction;
    an effluent filter element, the effluent filter element being generally planar and parallel to the influent filter element and having a plurality of parallel pleats parallel to a second direction, the second direction perpendicular to the first direction; and
    a filter frame for securing the influent filter element to the effluent filter element forming a straight air path perpendicular to the influent and effluent filter elements with the influent filter element and the effluent filter element in series relative to the straight air path.

2. The air filter of claim 1, wherein the influent filter element and the effluent filter element further comprise:
    a influent mesh layer and a corresponding effluent mesh layer;
    one or more layers of fibrous filter media between the influent mesh layer and the effluent mesh layer.

3. The air filter of claim 2, wherein the fiberous filter media is cotton fiber.

4. The air filter of claim 2 further comprising:
    one or more layers of manufactured fiber filter media between the one or more layers of fiberous filter media and the effluent mesh layer.

5. The air filter of claim 4, wherein the manufactured fiber is a spunbond polyester fiber.

6. The air filter of claim 2, wherein at least one of the one or more fiberous filter media layers is plain-woven cotton gauze.

7. The air filter of claim 2, wherein at least one of the one or more fiberous filter media layers is a non-woven hydroentangled cotton fabric.

8. The air filter of claim 2 wherein the influent filter element further comprises:
    a foam layer between the influent mesh layer and the one or more layers of fiberous filter media.

9. The air filter of claim 8 further comprising:
    an efficacious amount of oil disposed in the foam layer.

10. The air filter of claim 2 further comprising an efficacious amount of oil disposed in at least one of the one or more fiberous filter layers.

11. The air filter of claim 2, wherein the one or more layers of fibrous filter media further comprise:
    a first cotton mesh layer having a first cotton mesh density, and a second cotton mesh layer having a second cotton mesh density that is higher than the first cotton mesh density, and the first cotton mesh layer is disposed adjacent the one or more layers of synthetic foam and the second cotton mesh layer between the first cotton mesh layer and the effluent mesh layer.

12. The air filter of claim 4, wherein the one or more layers of manufactured fiber filter media further comprise:
    a first manufactured mesh layer having a first manufactured mesh density, and a second manufactured mesh layer having a second manufactured mesh density that is higher than the first manufactured mesh density, and the first manufactured mesh layer is disposed adjacent the one or more layers of natural fiber filter media and the second manufactured mesh layer between the first manufactured mesh layer and the effluent mesh layer.

13. The air filter of claim 12, wherein the manufactured fiber is a spunbond polyester fiber.

14. The air filter of claim 2, wherein the first direction and the second direction are parallel.

15. An air filter comprising:
   a generally planar influent filter element having a plurality of parallel pleats parallel to a first direction, the influent filter element having;
      a influent mesh layer and a corresponding effluent mesh layer for supporting filter media;
      one or more layers of synthetic foam between the influent mesh layer and the effluent mesh layer;
      one or more layers of cotton fiber filter media formed from a piteous, absorbent, and wickable natural fiber between the one or more layers of synthetic foam and the effluent mesh layer;
      an efficacious amount of oil disposed in the one or more layers of synthetic foam and the one or more layers of cotton fiber filter media;
   a generally planar effluent filter element, the effluent filter element being parallel to the influent filter element and having a plurality of parallel pleats parallel to a second direction, the second direction perpendicular to the first direction; the effluent filter element having;
      a influent mesh layer and a corresponding effluent mesh layer for supporting filter media;
      one or more layers of cotton fiber filter media formed from a piteous, absorbent, and wickable natural fiber between the influent mesh layer and the effluent mesh layer; and
      one or more layers of spunbond polyester fiber filter media between the one or more layers of cotton fiber filter media and the effluent mesh layer;
   an efficacious amount of oil disposed in the one or more layers of synthetic foam and the one or more layers of cotton fiber filter media; and
   a filter frame for securing the influent filter element to the effluent filter element forming an air path perpendicular to the first and second filter elements.

16. An air filter comprising:
   a filter frame forming an air path having an influent end and an effluent end, the filter frame for securing two or more filter elements in series with respect to the air path;
   an influent filter element secured to the influent end of the filter frame, the influent filter element being generally planar and having a plurality of pleats aligned in a first direction; and
   an effluent filter element secured to the effluent end of the filter frame, the effluent filter element being generally planar and parallel to the influent filter element and having a plurality of parallel pleats aligned in a second direction, the second direction being substantially perpendicular to the first direction.

17. The air filter of claim 16, wherein the influent filter element and the effluent filter element further comprise:
   a influent mesh layer and a corresponding effluent mesh layer;
   one or more layers of fiberous filter media between the influent mesh layer and the effluent mesh layer.

18. The air filter of claim 17, wherein the fiberous filter media is cotton fiber.

19. The air filter of claim 17 further comprising:
   one or more layers of manufactured fiber filter media between the one or more layers of fiberous filter media and the effluent mesh layer.

20. The air filter of claim 19, wherein the manufactured fiber is a spunbond polyester fiber.

21. The air filter of claim 17, wherein at least one of the one or more fiberous filter media layers is plainwoven cotton gauze.

22. The air filter of claim 17, wherein at least one of the one or more fiberous filter media layers is a nonwoven hydroentangled cotton fabric.

23. The air filter of claim 17 wherein the influent filter element further comprises:
   a foam layer between the influent mesh layer and the one or more layers of fiberous filter media.

* * * * *